(12) United States Patent
Ohlenbusch et al.

(10) Patent No.: US 8,606,338 B2
(45) Date of Patent: *Dec. 10, 2013

(54) INTELLIGENT DATA NETWORK WITH POWER MANAGEMENT CAPABILITIES

(75) Inventors: Norbert Ohlenbusch, Andover, MA (US); Joseph Wronski, Jefferson, MA (US); Paul J. Gaudet, Dracut, MA (US); Thomas P. Blackadar, Natick, MA (US); Steven R. Oliver, Attleboro, MA (US)

(73) Assignee: FitSense Technology, Inc., Shelton, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/351,674

(22) Filed: Jan. 17, 2012

(65) Prior Publication Data

US 2012/0155353 A1 Jun. 21, 2012

Related U.S. Application Data (60) Division of application No. 13/083,869, filed on Apr. 11, 2011, now Pat. No. 8,150,424, which is a continuation of application No. 12/315,729, filed on Dec. 5, 2008, now Pat. No. 7,937,121, which is a continuation of application No. 11/402,182, filed on Apr. 11, 2006, now Pat. No. 7,466,979, which is a continuation of application No. 09/779,900, filed on Feb. 8, 2001, now Pat. No. 7,187,924.

(60) Provisional application No. 60/180,915, filed on Feb. 8, 2000.

(51) Int. Cl.
*H04B 1/38* (2006.01)
*H04B 1/16* (2006.01)
*H04B 7/00* (2006.01)

(52) U.S. Cl.
USPC .................. 455/574; 455/343.5; 455/41.1

(58) Field of Classification Search
USPC .................. 455/574, 343.1, 343.2, 426.1
See application file for complete search history.

(56) References Cited

U.S. PATENT DOCUMENTS

| 4,247,908 A | 1/1981 | Lockhart, Jr. et al. |
| 4,829,540 A | 5/1989 | Waggener, Sr. et al. |
| 5,029,183 A | 7/1991 | Tymes |

(Continued)

OTHER PUBLICATIONS

Salkintzis, A.K., "An Outband Paging Protocol for Energy-Efficient Mobile Communications", IEEE Transactions on Broadcasting, vol. 48, No. 3, Sep. 2002, pp. 246-256.

(Continued)

*Primary Examiner* — Tilahun B Gesesse
(74) *Attorney, Agent, or Firm* — Wolf, Greenfield & Sacks, P.C.

(57) ABSTRACT

In one embodiment, a method for implementing two-way communication between at least first and second devices comprises steps of: (a1) during finite time periods following transmission of respective first messages from the first device to the second device, using the first device to listen for second messages transmitted from the second device to first device; and (a2) after each of the finite time periods following the transmission of the respective first messages from the first device to the second device, ceasing to use the first device to listen for second messages transmitted from the second device to the first device until after the first device transmits another first message to the second device.

13 Claims, 4 Drawing Sheets

(56) References Cited

U.S. PATENT DOCUMENTS

| | | | |
|---|---|---|---|
| 5,241,542 A * | 8/1993 | Natarajan et al. | 370/311 |
| 5,383,915 A * | 1/1995 | Adams | 607/60 |
| 5,404,577 A | 4/1995 | Zuckerman et al. | |
| 5,416,779 A | 5/1995 | Barnes et al. | |
| 5,479,441 A | 12/1995 | Tymes et al. | |
| 5,541,976 A | 7/1996 | Ghisler | |
| 5,606,728 A | 2/1997 | Keba et al. | |
| 5,608,412 A | 3/1997 | Welles et al. | |
| 5,625,882 A | 4/1997 | Vook et al. | |
| 5,668,880 A | 9/1997 | Alajajian | |
| 5,720,770 A * | 2/1998 | Nappholz et al. | 607/30 |
| 5,729,590 A | 3/1998 | Dimitriadis et al. | |
| 5,752,976 A * | 5/1998 | Duffin et al. | 607/32 |
| 5,838,226 A | 11/1998 | Houggy et al. | |
| 5,881,366 A | 3/1999 | Bodenmann et al. | |
| 5,987,018 A | 11/1999 | Freeburg et al. | |
| 6,154,642 A | 11/2000 | Dumont et al. | |
| 6,157,966 A | 12/2000 | Montgomery et al. | |
| 6,169,905 B1 | 1/2001 | Fukuda | |
| 6,236,674 B1 | 5/2001 | Morelli et al. | |
| 6,584,352 B2 * | 6/2003 | Combs et al. | 607/9 |
| 6,650,629 B1 | 11/2003 | Takahashi et al. | |
| 6,771,213 B2 | 8/2004 | Durst et al. | |
| 7,027,773 B1 * | 4/2006 | McMillin | 455/41.2 |
| 7,187,924 B2 | 3/2007 | Ohlenbusch et al. | |
| 7,466,979 B2 | 12/2008 | Ohlenbusch et al. | |
| 8,014,867 B2 * | 9/2011 | Cooke et al. | 607/31 |

OTHER PUBLICATIONS

Salkintzis, A.K. et al., "Mobile Packet Data Technology: An Insight into MOBITEX Architecture", IEEE Personal Communications, Feb. 1997, pp. 11-18.

Sozer, E.M. et al., "Underwater Acoustic Networks", IEEE Jrnl. Of Oceanic Engineering, vol. 25, No. 1, Jan. 2000, pp. 72-83.

Salkintzis, A.K. et al., "An In-Band Power-Saving Protocol for Mobile Data Networks", IEEE Transactions on Communications, vol. 46, No. 9, Sep. 1998, pp. 1194-1205.

Salkintzis, A.K. et al., "An Energy Efficient Protocol for Mobile Computing Environments", Intn'l Workshop on Mobile Communications, Thessaloniki, Greece, Sep. 19-20, 1996, pp. 290-294.

Salkintzis, A.K. et al., "An Energy Saving Protocol for Mobile Data Networks", Int'l Conf. on Advances in Communication and Control, COMCON 5, Jun. 26-30, 1995, pp. 511-522.

* cited by examiner

INTELLIGENT DATA NETWORK WITH POWER MANAGEMENT CAPABILITIES

This application is a divisional of U.S. patent application Ser. No. 13/083,869, filed Apr. 11, 2011, which is a continuation of U.S. patent application Ser. No. 12/315,729, filed Dec. 5, 2008, and now U.S. Pat. No. 7,937,121, which is a continuation of U.S. patent application Ser. No. 11/402,182, filed Apr. 11, 2006, and now U.S. Pat. No. 7,466,979, which is a continuation of U.S. patent application Ser. No. 09/779,900, filed Feb. 8, 2001, and now U.S. Pat. No. 7,187,924, which claims the benefit of U.S. Provisional Application Ser. No. 60/180,915, filed Feb. 8, 2000. The entire contents of each of the foregoing documents is incorporated herein by reference.

BACKGROUND OF THE INVENTION

1. Field of the Invention

The present invention is directed to the field of electronic communications.

2. Discussion of Related Art

The current state of the art in networked systems strives to deliver as much of a data payload as fast as possible. Even with the current low power devices and protocols such as IEEE 802.15 and IEEE 1451, the emphasis is on transferring large amounts of data and applications.

SUMMARY OF THE INVENTION

According to one aspect of the present invention, a method for implementing wireless two-way communication between at least first and second ambulatory devices comprises first and second steps which are performed while the first and second ambulatory devices are being carried by a person in locomotion on foot. For the first step, during finite time periods following transmission of respective first messages from the first device to the second device, powering on a receiver included in the first device to enable the first device to listen for second messages transmitted from the second device to the first device. For the second step, after each of the finite time periods following the transmission of the respective first messages from the first device to the second device, powering down the receiver included in the first device, and each of the foregoing.

According to another aspect of the invention, a method for implementing two-way wireless communication between at least first and second ambulatory devices comprises first and second steps which are performed while the first and second ambulatory devices are being carried by a person in locomotion on foot. For the first step, during finite time periods following reception by the second device of respective first messages from the first device, when the second device needs to communicate with the first device, powering on a transmitter included in the second device and using the transmitter included in the second device to transmit second messages to the first device. For the second step, after each of the finite time periods following reception by the second device of respective first messages from the first device, powering down the transmitter included in the second device and ceasing to use the transmitter included in the second device to transmit second messages to the first device until after the second device receives another first message from the first device.

According to another aspect of the invention, a first, ambulatory device capable of engaging in wireless two-way communication with at least a second device comprises a first sensor configured to monitor a physical or physiological condition of a person, a first transmitter, a first receiver, and at least one first controller coupled to the first sensor, the first transmitter, and the first receiver. The at least one first controller is configured to power on the first receiver to listen for second messages from the second device during finite time periods following use of the first transmitter to transmit respective first messages to the second device. The at least one first controller is further configured to cause at least some of the first messages to include data concerning the physical or physiological condition of the person monitored by the first sensor, and to power down the first receiver after each of the finite time periods following use of the transmitter to transmit respective first messages to the second device.

According to another aspect of the invention, a second, ambulatory device capable of engaging in two-way communication with at least a first device comprises second circuitry configured to render the second device operable as at least one of a wristwatch, a cellular telephone, a personal data assistant, and a portable music device, a second transmitter, a second receiver, and at least one second controller coupled to the second transmitter and the second receiver. The at least one second controller is configured to power on the second transmitter to transmit second messages to the first device during finite time periods following reception by the second receiver of respective first messages from the first device. The at least one second controller is further configured to power down the second transmitter after transmission of each of the second messages from the second device to the first device.

According to another aspect of the invention, a method for implementing two-way communication between at least first and second devices comprises steps of: (a1) during finite time periods following reception by the second device of respective first messages from the first device, using the second device to transmit second messages to the first device; and (a2) after each of the finite time periods following reception by the second device of respective first messages from the first device, ceasing to use the second device to transmit second messages to the first device until after the second device receives another first message from the first device.

According to another aspect of the invention, a first device capable of engaging in two-way communication with at least a second device comprises a transmitter; a receiver; and at least one controller. The at least one controller is coupled to the transmitter and the receiver, and is configured to power on the receiver to listen for second messages from the second device during finite time periods following use of the transmitter to transmit respective first messages to the second device. The at least one controller is further configured to power down the receiver after each of the finite time periods following use of the transmitter to transmit respective first messages to the second device.

According to another aspect of the invention, a second device capable of engaging in two-way communication with at least a first device comprises a transmitter; a receiver; and at least one controller. The at least one controller is coupled to the transmitter and the receiver, and is configured to power on the transmitter to transmit second messages to the first device during finite time periods following reception by the receiver of respective first messages from the first device. The at least one controller is further configured to power down the transmitter after transmission of each of the second messages from the second device to the first device.

According to another aspect of the invention, a first device capable of engaging in two-way communication with at least a second device comprises: means for using the first device to listen for second messages transmitted from the second device to first device during finite time periods following transmission of respective first messages from the first device to the second device; and means for, after each of the finite time periods following the transmission of the respective first messages from the first device to the second device, ceasing to use first device to listen for second messages transmitted from the second device to the first device until after the first device transmits another first message to the second device.

According to another aspect of the invention, a second device capable of engaging in two-way communication with at least a first device comprises: means for using the second device to transmit second messages to the first device during finite time periods following reception by the second device of respective first messages from the first device; and means for, after each of the finite time periods following reception by the second device of respective first messages from the first device, ceasing to use the second device to transmit second messages to the first device until after the second device receives another first message from the first device.

According to another aspect of the invention, a method for implementing two-way communication between at least first and second devices comprises steps of: (a1) during finite time periods following transmission of respective first messages from the first device to the second device, powering on a receiver included the first device to listen for second messages transmitted from the second device to first device; and (a2) after each of the finite time periods following the transmission of the respective first messages from the first device to the second device, powering off the receiver included in the first device.

According to another aspect of the invention, a method for implementing two-way communication between at least first and second devices comprises steps of: (a1) during finite time periods following reception by the second device of respective first messages from the first device, when the second device needs to communicate with the first device, powering on a transmitter included in the second device to transmit second messages to the first device; and (a2) after transmission of each of the second messages from the second device to the first device, powering off the transmitter included in the second device.

According to another aspect of the invention, a first device capable of engaging in two-way communication with at least a second device comprises: means for powering on a receiver included the first device to listen for second messages transmitted from the second device to first device during finite time periods following transmission of respective first messages from the first device to the second device; and means for, after each of the finite time periods following the transmission of the respective first messages from the first device to the second device, powering off the receiver included in the first device.

According to another aspect of the invention, a second device capable of engaging in two-way communication with at least a first device comprises: means for when the second device needs to communicate with the first device, powering on a transmitter included in the second device to transmit second messages to the first device during finite time periods following reception by the second device of respective first messages from the first device; and means for, after transmission of each of the second messages from the second device to the first device, powering off the transmitter included in the second device.

DETAILED DESCRIPTION OF THE INVENTION

Figure 1:
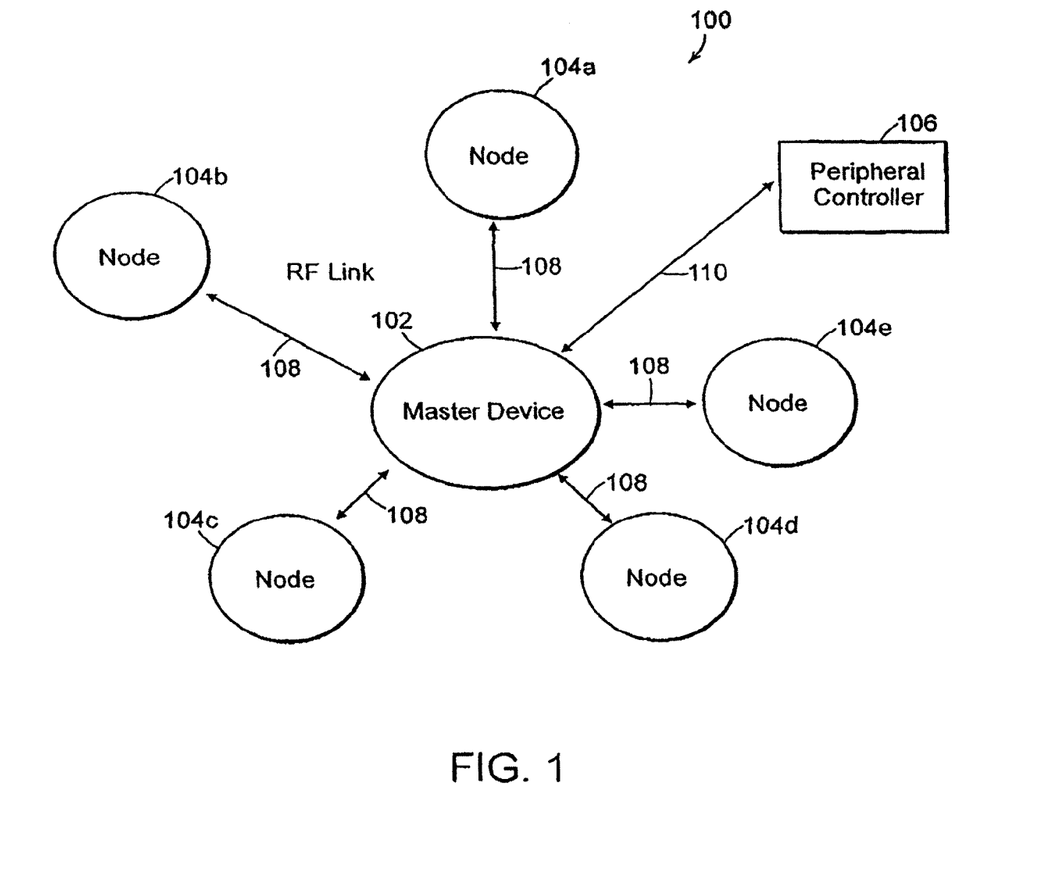
FIG. 1 is a diagram of an intelligent network configured in accordance with one illustrative embodiment of the invention.

FIG. 1 shows an illustrative embodiment of an intelligent network 100 that may incorporate various aspects of the present invention. As shown, the intelligent network 100 may include a MASTER DEVICE 102, a plurality of NODEs 104a-e, and a peripheral controller 106. In the embodiment shown, only a single MASTER DEVICE 102 is included in the network 100. Although such an implementation may provide certain advantages, it should be appreciated that, in alternative embodiments, additional MASTER DEVICES 102 may be employed. It should also be appreciated that additional or no peripheral controllers 106, and/or additional or fewer NODEs 104 (even a single NODE 104) may be employed in alternative embodiments of the invention. Each of the devices in the network 100 may be powered from its own power source (e.g., a battery) so as to permit it to be portable or ambulatory.

In the example shown, the MASTER DEVICE 102 communicates with each of the NODEs 104 via a respective wireless communication link 108 (e.g., a radio frequency (RF) link), and also communicates with the peripheral device 106 via a wireless communication link 110 (e.g., an RF link). It should be appreciated, of course, that any of a number of alternative communication media may be used to inter-link these devices, and the invention is not limited to RF links or wireless communication links in general. For example, respective pairs of the devices may alternatively be hard-wired, capacitively coupled, or linked by infrared, laser, or audio communications, or the like.

Hereinafter, the intelligent network 100 is alternatively referred to as the Personal Local Area Network ("the PLAN"). In the embodiment described herein, the NODEs 104a-e of the PLAN 100 are "intelligent," i.e., they include respective controllers or other circuitry capable of processing data, and the MASTER DEVICE 102 expects to receive only minimal amounts of pre-processed data from the NODEs 104. Because the data may be processed by each NODE 104 prior to transmission to the MASTER DEVICE 102, thereby leaving only minimal interpretation at the next application level, the data transmission requirements of the PLAN 100 may be minimal. In order to keep the PLAN 100 intelligent and reliable, a communication link may also be provided from the MASTER DEVICE 102 to the NODEs 104 so that the MASTER DEVICE 102 can occasionally provide data and instructions to the NODEs 104. According to one aspect of the invention, the MASTER DEVICE 102 is permitted to communicate with the NODEs 104 only during finite periods of time following reception of messages from the respective NODEs 104.

Figure 2:
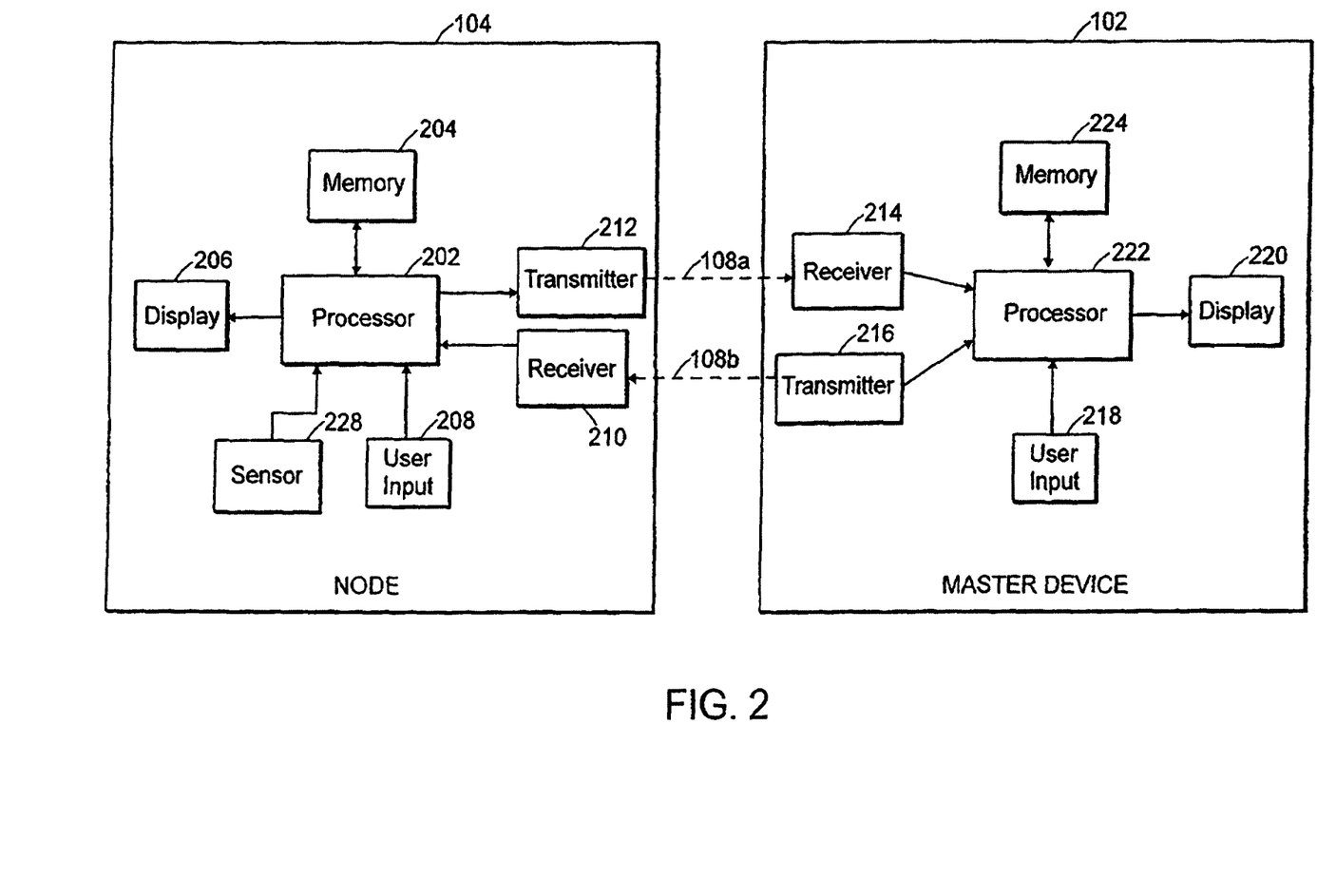
FIG. 2 is a block diagram showing an illustrative embodiment of the MASTER DEVICE and a NODE of the network shown in FIG. 1.

FIG. 2 shows an illustrative embodiment of the MASTER DEVICE 102 and one of the NODEs 104 of FIG. 1. As shown, the MASTER DEVICE 102 may include a processor 222 having coupled thereto: a receiver 214, a transmitter 216, a user input device 218, a display 220, and a memory 224. Similarly, the NODE 104 may include a processor 202 having coupled thereto: a memory 204, a display 206, a user input device 208, a receiver 210, and a transmitter 212. In addition, the NODE 104 may include a sensor 228 coupled to the processor. Examples of sensors 228 that may be included in the respective NODEs 104a-e of the PLAN 100 are given below.

As illustrated in FIG. 2, the transmitter 212 of the NODE 104 may communicate with the receiver 214 of the MASTER DEVICE 102 via a wireless communication link 108a (e.g., an RF link), and the transmitter 216 of the MASTER DEVICE 102 may communicate with of course, it is not necessary that a separate transmitter and receiver, the receiver 210 of the NODE 104 via a wireless communication link 108b (e.g., an RF link). It should be appreciated, of course, that the transmitter and receiver in each device need not be distinct units, and that a single "transceiver" may alternatively be employed.

In one illustrative embodiment, all devices in the network operate on a single, common (RF) frequency. Therefore, in such an embodiment, the transmitters 212 and 216 and the receivers 210 and 214 of FIG. 2 all would communicate using the same frequency. It should be appreciated, however, that some aspects of the invention may be practiced with transmitter/receiver pairs, or transceivers, operating at different and/or multiple frequencies, and that the invention is not limited to applications wherein only a single frequency is used. In one embodiment, the transmitter 216 and receiver 214 of the MASTER DEVICE 102 are used to communicate with all of the NODEs 104 in the network. It should be appreciated, however, that separate transmitters 216 and receivers 214 may be used to communicate with the respective NODEs 104, and that the invention is not limited to embodiments wherein only a single transmitter/receiver pair, or transceiver, is employed in any device in the PLAN 100.

In most local area networks (LANs), all processors, sensors and/or actuators of the network must be synchronized. In one embodiment of the invention, the respective devices in the PLAN 100 need not be synchronized. The PLAN 100 may, for example, enable small, variable amounts of data to be transferred asynchronously from the NODEs 104 to the MASTER DEVICE 102, or vice versa, depending on the transaction being performed. In one illustrative embodiment, operation of the PLAN 100 is based on two assumptions:

1) The data in the NODEs 104a-e may be regenerative and processed at the NODE 104 itself. Each such "intelligent" NODE 104 in the PLAN 100 may have built in intelligence and, as such, may process the data before it is transmitted to the MASTER DEVICE 102.

2) The MASTER DEVICE 102 may have a look up table for the NODEs 104 that the MASTER DEVICE 102 has permission to listen to. The MASTER DEVICE 102 may parse the header of the incoming messages:
   to determine if there are any messages from its NODEs 104, and
   to see if there are any network control messages.

In any wireless network, there are two basic devices used for inter-device communication: (1) a transmitter (e.g., one of the transmitters 212 and 216 of FIGS. 2), and (2) a receiver (e.g., a corresponding one of the receivers 210 and 214 of FIG. 2). When either of these devices is operational, it consumes power. Thus, in order to conserve power, is desirable to power down each transmitter and receiver in the network as often as possible.

Most networks have an internal timing mechanism for keeping track of time, and every node in the network is given the same timing information, or works from the same time base. Typically, devices in a network are allocated certain time windows during which they are permitted to transmit and certain time windows when they must listen for incoming messages, and each device transmits and receives only during these specified times. Because each device is required to turn on its receiver during each scheduled "receive" time window, i.e., each time it might receive a message from the network, the receiver consumes power unnecessarily each time no messages are received during such windows.

Additionally, to keep the clocks of all devices in a network synchronized (thereby assuring that each device transmits/receives messages during the appropriate time windows), prior art networks typically communicate synchronization information among devices in the network (at least occasionally) using intra-network messages or signals. Because the device transmitters/receivers and associated time keeping circuitry must be operational to communicate and process this information, a significant amount of power is consumed merely in keeping the network synchronized.

In contrast to such networks, the PLAN 100 may operate asynchronously, i.e., without specified transmit/receive time windows for the network devices. For example, in one illustrative embodiment, the NODE(s) 104 initiate all data transfers to the MASTER DEVICE 102 according to some specified criteria (which may be random) or whenever they determine such transfers should take place, and each NODE 104 expects to receive data only for a prescribed period of time after that NODE 104 has made a transmission to the MASTER DEVICE 102. Thus, in this embodiment, the MASTER DEVICE 102 is permitted to communicate with each NODE 104 only during this prescribed time period after the MASTER DEVICE 102 has received a message from that NODE 104. (This is akin to a pay telephone from which an employee can call his or her boss, but only when the employee calls the boss can the boss tell the employee what to do. This analogy assumes the boss can never initiate a phone call to the pay phone).

Therefore, in the above-described embodiment, power consumed by the NODEs 104 may be minimized by powering on the receivers of the NODEs 104 (e.g., the receiver 210) only for brief periods of time after the NODEs 104 have transmitted respective messages to the MASTER DEVICE 102, and not powering them on repeatedly during their specified "receive" time windows, as is done in prior art networks. In addition, power need not be consumed by the transmitters, receivers and associated circuitry of the network devices of the PLAN 100 to ensure that they all are synchronized with one another. It should be appreciated that, in addition to the transmitters and receivers, other devices and/or portions of other devices in the MASTER DEVICE 102 and/or NODEs 104 may also be powered down during intervals when their use is not required, thereby further conserving power in the system.

Because, in the embodiment described above, each NODE 104 knows that it will not receive a message from the MASTER DEVICE 102 unless it first transmits a message to the MASTER DEVICE 102, all NODEs 104 can power down both their transmitters 212 and their receivers 210 until they are ready to transmit messages to the MASTER DEVICE 102. When a NODE 104 desires to initiate communication with the MASTER DEVICE 102, only then does that NODE 104 need to turn on its transmitter 212. And, only after that NODE 104 has completed the transfer of the message to the MASTER DEVICE 102 does the NODE 104 need to turn on its receiver 210 to receive a reply message, if any, from the MASTER DEVICE 102.

Similarly, in the embodiment described above, only when the MASTER DEVICE 102: (1) has just recently received a message from the NODE 104, and (2) has a message to communicate to the NODE 104, is the MASTER DEVICE 102 required to turn on its transmitter 216.

In one implementation, each message transmitted from the NODE 104 to the MASTER DEVICE 102 may include information identifying a time window during which the NODE 104 expects to send a subsequent message to the MASTER DEVICE 102. In such an embodiment, the MASTER DEVICE 102 can also power down its receiver 214, after receiving this information, until the beginning of the identified time window. The time window for the subsequent transmission may, for example, be selected at random (e.g., using a random number generator or the like) so as to minimize the risk of collisions with other messages transmitted on the PLAN 100. In one embodiment, if no such time window is identified or no message is received during a specified time window, the MASTER DEVICE 102 may then automatically turn on its receiver 214 and continually listen for incoming messages. After not receiving any incoming messages for a particular time period, the MASTER DEVICE 102 may even shut down its receiver indefinitely (e.g., until subsequent user intervention such as with user input device 218).

In another implementation, in response to receiving each messages from a respective NODE 104, the MASTER DEVICE 102 may send a reply message to the NODE 104 indicating when the MASTER DEVICE 102 expects to next receive a subsequent message from the NODE 104. The MASTER DEVICE 102 therefore may schedule the times of subsequent message transmissions from the various NODEs 104 and may power down its receiver 214 at all other times, thereby conserving power. The scheduled time windows for the subsequent message transmissions by the respective NODEs 104 may, for example, be selected at random (e.g., using a random number generator or the like) so as to minimize the risk of collisions with other messages transmitted on the PLAN 100, or may be deliberately scheduled so as to avoid any such collisions all together. As with the embodiment described above, if no such time window is identified, or no message is received during a specified time window, the MASTER DEVICE 102 may then automatically turn on its receiver 214 and continually listen for incoming messages. After not receiving any incoming messages for a particular time period, the MASTER DEVICE 102 may even shut down its receiver indefinitely (e.g., until subsequent user intervention such as with user input device 218). In yet another implementation, the receiver 214 of the MASTER DEVICE 102 may simply remain on at all times the MASTER DEVICE 102 is in use. Such an implementation may make sense in an embodiment of the PLAN 100 including a large number of NODEs 104 that frequently transmit information to the MASTER DEVICE 102, or in an embodiment wherein power management of the MASTER DEVICE 102 is not a significant concern.

Figure 3:
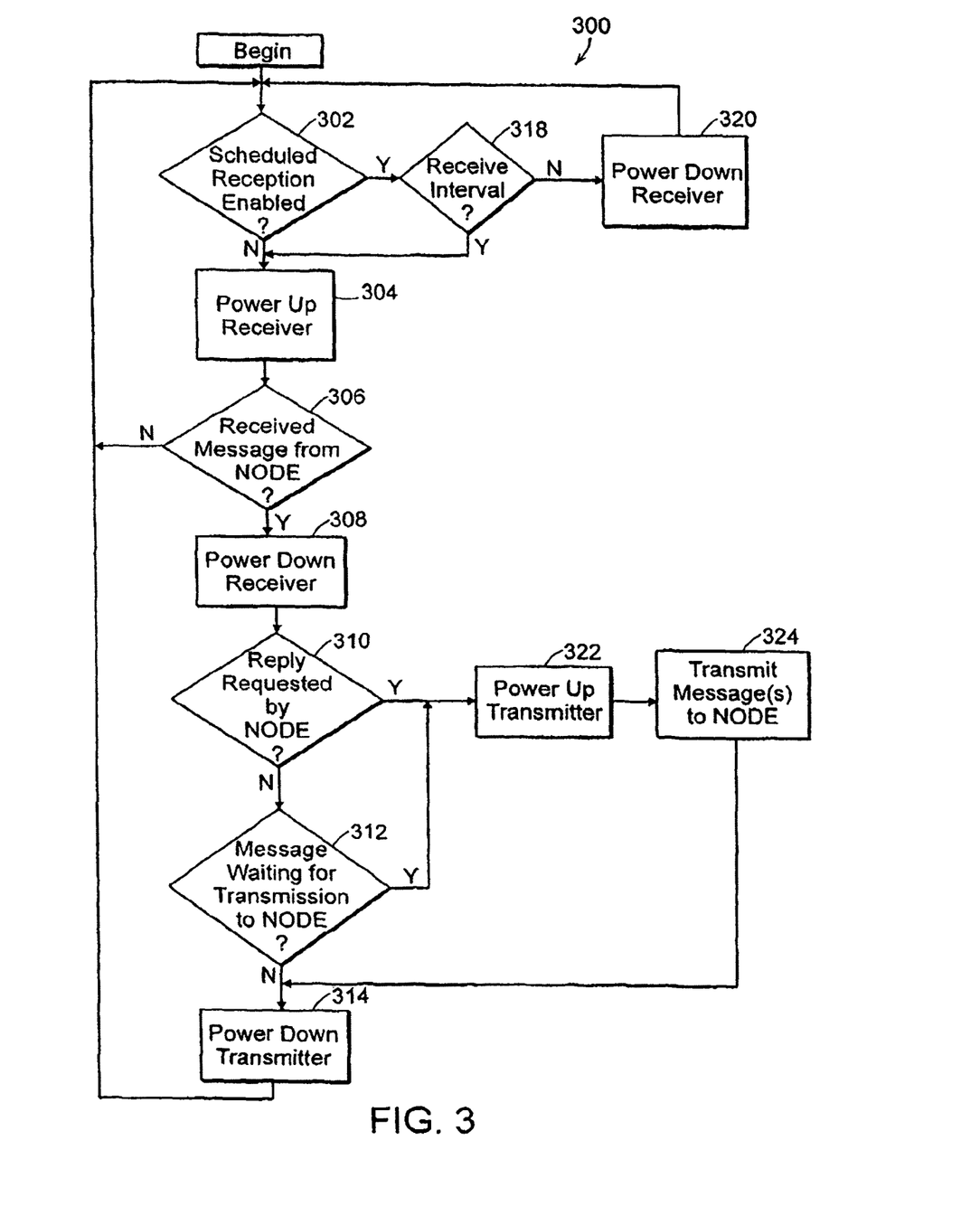
FIG. 3 is a flow diagram showing an illustrative example of a software routine that may be executed by a controller of the MASTER DEVICE shown in FIG. 2.
Figure 4:
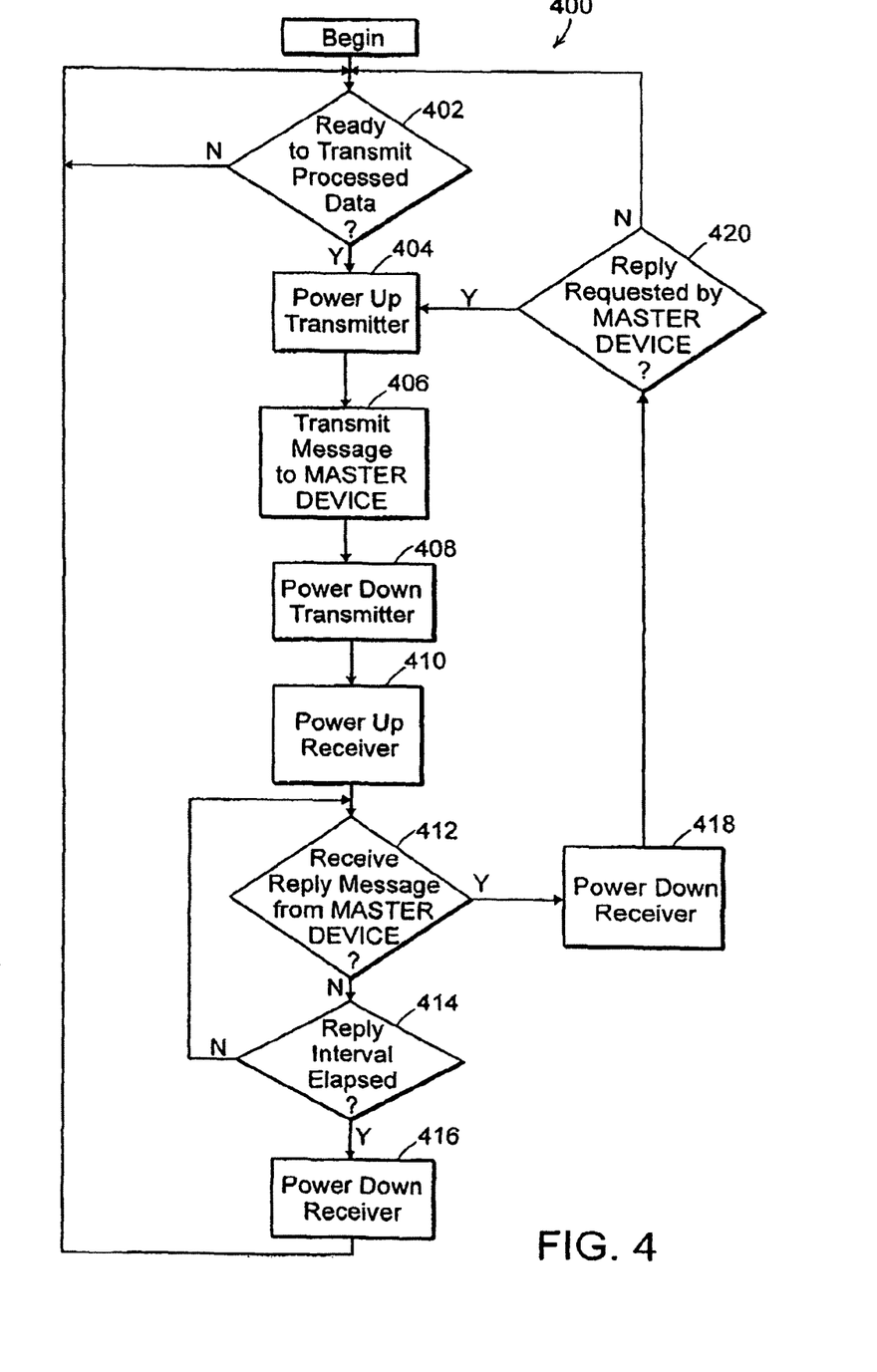
FIG. 4 is a flow diagram showing an illustrative example of a software routine that may be executed by a controller of the NODE shown in FIG. 2.

Example implementations of routines that may be performed by the MASTER DEVICE 102 and any one of the NODEs 104 in accordance with an embodiment of the invention are shown in FIGS. 3 and 4, respectively. The routine 300 of FIG. 3 may, for example, be executed by the processor 222 of FIG. 2 in response to instructions stored in the memory 224. The routine 400 of FIG. 4 may, for example, be executed by the processor 202 of FIG. 2 in response to instructions stored in the memory 204.

With regard to the illustrative routines 300 and 400, it should be appreciated that the precise order of the method steps is not critical, and that the invention is not limited to embodiments that perform method steps in precisely in the order shown. Additionally, it should be appreciated that the method steps shown in FIGS. 3 and 4 represent only two of numerous possible routines that can achieve the desired results, and the invention is not limited to the particular routines shown. Further, it should be understood that some embodiments of the invention can perform fewer than all of the functions performed by the method steps illustrated in FIGS. 3 and 4, and that the invention is not limited to embodiments which employ all of the functions performed by the illustrated routines.

Referring to FIG. 3. the routine 300 begins at a step 302, wherein it is determined whether "scheduled reception" is enabled for the MASTER DEVICE 102. Scheduled reception may refer, for example, to a situation wherein a NODE 104 indicated (in a message previously sent to the MASTER DEVICE 102) a time window in which it expected to send a subsequent message, or to a situation in which the MASTER DEVICE 102, in a reply message to a NODE 104, indicated to the NODE 104 when the MASTER DEVICE 102 expected to receive a subsequent message from the NODE 104. In one implementation, when schedule reception is not enabled, the receiver 214 is powered on at all times the MASTER DEVICE 104 is in operation. When schedule reception is enabled in such an implementation, the receiver 214 of the MASTER DEVICE 102 may be powered on only during time intervals scheduled by the MASTER DEVICE 102 or one or more of the NODEs 104 as discussed above, or upon the failure of the MASTER DEVICE 102 to receive any incoming messages for a particular period of time, as also discussed above.

When, at the step 302, it is determined that scheduled reception is enabled, the routine 300 proceeds to a step 318, wherein it is determined whether it is currently a time window during which the MASTER DEVICE 102 should be looking for incoming messages from NODEs 104.

When, at the step 318, it is determined that it is not currently a receive interval, the routine 300 proceeds to a step 320, wherein the receiver 214 is powered down. After the step 320, the routine 300 returns to the step 302.

When, at the step 318, it is determined that it is currently a receive interval, the routine 300 proceeds to a step 304, wherein the receiver 214 of the MASTER DEVICE 102 is powered up.

When, at the step 302, it is determined that scheduled reception is not enabled, the routine 300 proceeds immediately to the step 304, without first proceeding to the step 318 to determine whether it is currently a receive interval.

After powering up the receiver at the step 304, the routine 300 proceeds to a step 306, wherein it is determined whether a message has been received from a NODE 104.

When, at the step 306, it is determined that no message has been received from a NODE 104, the routine 300 returns to the step 302.

When, at the step 306, it is determined that a message has been received from a NODE 104, the routine 300 proceeds to a step 308, wherein the receiver 214 is powered down.

After the step 308, the routine 300 proceeds to a step 310, wherein it is determined whether a reply has been requested by the NODE 104 that sent the received message.

When, at the step 310, it is determined that a reply has been requested by the transmitting NODE 104, the routine 300 proceeds to steps 322 and 324, wherein the transmitter 216 of the MASTER DEVICE 102 is powered up and used to transmit a reply message, as well as any other messages awaiting transmission, to the transmitting NODE 104.

After the step 324, the routine 300 proceeds to a step 314, wherein the transmitter 216 of the MASTER DEVICE 102 is powered down.

When, at the step 310, it is determined that no reply has been requested by the transmitting NODE 104, the routine 300 proceeds to a step 312, wherein it is determined whether any messages (other than a requested reply) are awaiting to be transmitted from the MASTER DEVICE 102 to the transmitting NODE 104. It should be appreciated that such messages awaiting transmission to the NODE 104 may also be embedded in a requested reply message to the transmitting NODE 104 (identified at the step 310).

When, at the step 312, it is determined that a message is waiting for transmission to the transmitting NODE 104, the routine 300 proceeds to the steps 322 and 324, wherein the transmitter 216 of the MASTER DEVICE 102 is powered up and the message awaiting transmission is transmitted to the NODE 102 that sent the original message to the MASTER DEVICE 102.

When, at the step 312, it is determined that no messages are awaiting transmission to the transmitting NODE 104, the routine 300 proceeds to the step 314, wherein the transmitter 216 of the MASTER DEVICE 102 is powered down.

After the step 314, the routine 300 returns to the step 302, wherein it is again determined whether scheduled reception is enabled for the MASTER DEVICE 102. If the MASTER DEVICE 102 requested a reply from the NODE 104 to which it sent a message at the step 324, a receive interval may begin immediately so that the MASTER DEVICE 102 can receive such a reply message when it is subsequently sent by the NODE 104.

Referring now to FIG. 4, the illustrative routine 400, which may be implemented by each of the NODEs 104, begins at a step 402, wherein it is determined whether the NODE 104 executing the routine 400 has accumulated and processed data which is ready for transmission to the MASTER DEVICE 102.

When, at the step 402, it is determined that the NODE 104 does have processed data ready for transmission to the MASTER DEVICE 102, the routine 400 proceeds to steps 404-408, wherein the transmitter of the NODE 104 (e.g., the transmitter 212 of FIG. 2) is powered up (step 404), is used to transmit the processed data to the MASTER DEVICE 102 (step 406), and is then powered down (408).

After the step 408, the routine 400 proceeds to a step 410, wherein the receiver of the NODE 104 (e.g., the receiver 210 of FIG. 2) is powered up.

After the step 410, the routine 400 proceeds to a step 412, wherein it is determined whether a reply message has been received from the MASTER DEVICE 102 in response to the message transmitted at the step 406.

When, at the step 412, it is determined that a reply message has been received from the MASTER DEVICE 102, the routine 400 proceeds to a step 418, wherein the receiver of the NODE 104 is powered down.

After the step 418, the routine 400 proceeds to a step 420, wherein it is determined whether a reply was requested by the MASTER DEVICE 102 in response to the message received from the MASTER DEVICE 102 at the step 412, for example, to acknowledge receipt of the message.

When, at the step 420, it is determined that a reply was requested by the MASTER DEVICE 102, the routine 400 proceeds to the steps 404-408, wherein the reply is transmitted to the MASTER DEVICE 102.

When, at the step 420, it is determined that no reply was requested by the MASTER DEVICE 102, the routine 400 returns to the step 402.

When, at the step 412, it is determined that no reply has yet been received from the MASTER DEVICE 102, the routine 400 proceeds to a step 414, wherein it is determined whether the interval during which the MASTER DEVICE 102 is permitted to communicate with the NODE 104 has elapsed. If the reply interval for the MASTER DEVICE 102 has not yet elapsed, the routine 400 returns to the step 412.

When, at the step 414, it is determined that the reply interval for the MASTER DEVICE 102 has elapsed, the routine 400 proceeds to a step 416, wherein the receiver of the NODE 104 (e.g., the receiver 210) is powered down.

After the step 416, the routine 400 returns to the step 402, wherein it is again determined whether the NODE 104 has processed data ready for transmission to the MASTER DEVICE 102.

It should thus be appreciated that, in the described embodiment of FIGS. 3 and 4, the NODEs 104 may initiate all data transfers between themselves and the MASTER DEVICE 102, but that, after such a transfer has been initiated, communication between the two devices may continue indefinitely until one decides not to request a reply from the other.

In one example embodiment, there are two major types of messages that may be communicated over the PLAN 100, each with subclasses of messages underneath. For example, "class one" messages may be unsolicited messages, and "class two" messages may be solicited messages. Both the NODEs 104 and the MASTER DEVICE 102 may transmit either class of messages.

Class one messages may, for example, be messages that require no response from the NODE 104 or the MASTER DEVICE 102. With class one messages, it may be assumed that the data was transmitted properly. This embodiment of the PLAN 100 may take advantage of the intelligence of its sensors by ensuring that, if there is a missing transmission and a class one message is not transmitted, the operation of the system employing the network is not compromised.

Class two messages may, for example, be messages that require a response or acknowledgement. The transmitting device (e.g., a NODE 104 or the MASTER DEVICE 102) may transmit a flag in the data packet of each class two message which requests that the receiving device respond to the message subclass.

The class of each message (i.e., class one or class two) may, for example, affect the outcome of the steps 310 and 420 of the illustrative routines of FIGS. 3 and 4, respectively. That is, referring to FIG. 3, if it is determined (at the step 310) that the message received from the NODE 104 is a class two message, the routine 300 may proceed to the step 322, wherein the transmitter 216 is powered up and an acknowledge or reply message is immediately sent to the NODE 104. If, on the other hand, it is determined (at the step 310) that the message received from the NODE 104 is a class one message, the routine 300 may instead proceed to the step 312, wherein a message is transmitted to the NODE 104 only if the MASTER DEVICE 102 happens to have an outgoing message ready to send.

Similarly, referring to FIG. 4, if it is determined (at the step 420) that the message received from the MASTER DEVICE 102 (at the step 412) is a class two message, the routine 400 may proceed to the step 404, wherein the transmitter 212 is powered up and an acknowledge or reply message is sent to the MASTER DEVICE 102. If, on the other hand, it is determined (at the step 420) that the message received from the MASTER DEVICE 102 is a class one message, the routine 400 may instead proceed to the step 402, wherein it waits until the NODE 104 is again ready to transmit processed data to the MASTER DEVICE 102.

Thus, the above-described embodiment of the PLAN 100 can provide a reliable link whenever one or more class two messages are sent. Each NODE 104 may control the data throughput rate of the transfer. The MASTER DEVICE 102 may service other NODEs 104 during a reliable link transfer. Class two messages may, for example, be initiated from the peripheral controller 106 (described below) to the MASTER DEVICE 102, from a NODE 104 (that requires reliable data transfer), or from the MASTER DEVICE 102 (e.g., trying to negotiate network congestion).

One advantageous feature of at least some embodiments of this network is the ability of each NODE 104 to provide processed information to the MASTER DEVICE 102. The MASTER DEVICE 102 may, for example, simply store the processed data, further process the data, display a representation of the data, e.g., on the display 220, and/or pass the data onto the peripheral controller 106 (or multiple peripheral controllers 106). The peripheral controller 106, if employed, may be any of a number of devices, and the invention is not limited to any particular type of controller. The peripheral controller 106 may, for example, be an "intelligent" device such as application-based microcontroller or computer. The applications of the peripheral controller may, for example, include:
 Watch Display
 Physiological Monitor
 An RF Router
 A PC Interface
 A Two-way Pager Controller
 A Cellular Phone Controller
 A Land Phone Controller Furthermore, the functionality of either the MASTER DEVICE 102 and/or the peripheral controller 106 may be distributed across one another or across additional controllers for efficiency, space or energy savings, or any other reason.

The sensor 228 in each NODE 104 may take on any of numerous forms, and the invention is not limited to any particular type of sensor. In some embodiments, one or more NODEs 104 may use a microcontroller to process an analog signal from the sensor 228 to reduce the analog signal to a simple digital data stream for transmission to the MASTER DEVICE 104 in the PLAN 100.

An example of a sensor 228 that may be employed is a heart rate monitor. Such a NODE 104 may, for example, process a heart beat wave form to determine how many heart beats there are per minute, and report the calculated number of heartbeats, and perhaps the standard deviation thereof as well, to the MASTER DEVICE 102. The MASTER DEVICE 102 may then receive the data packet, check the authenticity of the sender, and store the data packet in an appropriate memory location. The MASTER DEVICE 102 and/or peripheral controller 106 may then, for example, retrieve and display the heart rate data on a watch-like device (e.g., a digital wristwatch) on a person's wrist. As used herein, the term "wristwatch" is not limited to devices capable of keeping time. Rather, the term "wristwatch" is intended to refer to any device that may be secured to the wrist of a person that is capable of displaying information, whether or not the devices also keep time. The implementation discussed above may be contrasted to conventional heart rate monitors which provide only a beat transmission and require the receiving device to do the computation necessary to obtain the heart rate information.

Each NODE 104 may alternatively employ any of numerous other types of sensors 228. Another example of a sensor 228 that may be employed in one or more of the NODEs 104 is an accelerometer. The output of such an accelerometer may, for example, be analyzed by the processor 202 to measure the foot contact times of a person, and the foot contact times may then be used to calculate the person's pace, speed, distance traveled, etc. An example of such a NODE 104, and the employment of such a NODE 104 in a PLAN 100 which also includes a wristwatch-type MASTER DEVICE 102 and a heart rate monitor (another NODE 104) is disclosed in co-pending patent application Ser. No. 09/643,165, filed on Aug. 21, 2000, and entitled MONITORING ACTIVITY OF A USER IN LOCOMOTION ON FOOT, the entire contents of which is hereby incorporated herein by reference.

Thus, a NODE 104 employing an accelerometer as its sensor 228 may, for example, transmit the foot contact time of the person, the distance traveled by the person, the current pace of the person, and/or the average pace of the person, as one or more values to the MASTER DEVICE 102 (e.g., a wristwatch), for processing, display, and/or transmission to the peripheral controller 106. The MASTER DEVICE 102 may, in turn, send calibration data or the like back to the NODE 104 during the predetermined, finite time periods after the MASTER DEVICE 102 receives such information from the NODE 104.

The PLAN 100 according to the invention may support any number of NODEs 104. There may, however, be a limit as to how many NODEs 104 can operate at one time. The PLAN 100 may, for example, be configured to transmit only short distances. Thus, the number of NODEs 104 in the PLAN 100 at any one time may be limited by physical constraints. The PLAN 100 may be such that, once the MASTER DEVICE 102 has a valid routing table of acceptable NODEs 104, whenever any of the routing table NODEs 104 are available, the data can be collected and moved into storage. As the NODEs 104 go out of range, the MASTER DEVICE 102 may, for example, simply stop recording the data.

Embodiments of the PLAN 100 may take on any of a number of forms. In one example, the MASTER DEVICE 102 may be embodied as a wrist watch, which has buttons (e.g., the user input device 218) and a display (e.g., the display 220), and the NODE(s) 104 may be embodied as a device including one or more intelligent physiological sensors 228 configured to monitor conditions such as: heart rate, EKG, foot contact time or foot loft time during footsteps, Pulse oximetry, blood pressure, EMG, blood glucose, body temperature, etc. Alternatively, the NODEs 104 may, for example, be integrated into bathroom scales, automotive computers, or automatic door openers for automotive and security systems. Conceivably, any intelligent device can be brought into this network as a NODE 104 or MASTER DEVICE 102. The PLAN 100 may, for example, be integrated into a system employing two-way pager devices so that physiological data can be sent onto the Internet directly from a person's body. The PLAN 100 may also be integrated into a system employing a digital wireless phone so that the data can be sent into the phone network. The PLAN 100 may further be integrated into a system employing a portable music machine, or a personal digital assistant, or any other "intelligent" device.

A NODE 104 of the PLAN 100 may, for example, be integrated into a small device that acts as a gateway device between other networks, such as IEEE 802.15, IEEE 1451, the HOME RF, Bluetooth, 10X or other such networks. By doing this, as one moves through a space, the NODE 104 of the PLAN 100 may become available to other networks, and the data from these other networks may become available to the PLAN 100, and the peripheral controller(s) 106 in the PLAN 100. In addition, by providing sufficient intelligence in the MASTER DEVICE 102 and an output port therefrom, the MASTER DEVICE 102 may also act like a gateway between different network protocols (e.g., PLAN 100 to Serial, RF to IEEE 802.15, RF to RF, etc.).

In one embodiment, the packet size of each message transmitted using the PLAN 100 may be 1/X of the total bandwidth of the system, where X is determined to be the acceptable guaranteed bandwidth of the system. In such an embodiment, data may be broken up into multiple (Y) packets, and with no one NODE 104 being permitted to consume more than X·Y percent of the available bandwidth at any one time. All NODEs 104 may have as much intelligence as required to meet or exceed the maximum network bandwidth.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A first, ambulatory device capable of engaging in wireless two-way communication with at least a second device, comprising:
   a first sensor configured to monitor a physical or physiological condition of a person while being transported by the person or by an article worn by the person;
   a first transmitter;
   a first receiver; and
   at least one first controller coupled to the first sensor, the first transmitter, and the first receiver, the at least one first controller being configured to power on the first receiver to listen for second messages from the second device during finite time periods following use of the first transmitter to transmit respective first messages to the second device, the at least one first controller being further configured to cause at least some of the first messages to include data concerning the physical or physiological condition of the person monitored by the first sensor, and to power down the first receiver after each of the finite time periods following use of the transmitter to transmit respective first messages to the second device.

2. The first device of claim 1, wherein the at least one first controller is further configured to, after each of the finite time periods following use of the first transmitter to transmit respective first messages to the second device, power down the first receiver until after the first transmitter is used to transmit another first message to the second device.

3. The first device of claim 1, in combination with the second device, wherein the second device comprises second circuitry configured to render the second device operable as at least one of a wristwatch, a cellular telephone, a personal data assistant, and a portable music device.

4. The first device of claim 1, in combination with the second device, wherein the second device comprises:
   a second transmitter;
   a second receiver; and
   at least one second controller coupled to the second transmitter and the second receiver, the at least one second controller being configured to power on the second transmitter to transmit second messages to the first device during finite time periods following reception by the second receiver of respective first messages from the first device, and being further configured to power down the second transmitter after transmission of each of the second messages from the second device to the first device.

5. The combination of claim 4, wherein the at least one second controller is configured to power down the second receiver during at least some time periods that are identified based upon information included in at least some of the first messages communicated from the first device to the second device, which information indicates when the first device expects to send at least one subsequent first message to the second device.

6. The first device of claim 1, wherein the sensor is configured to monitor a physical condition of the person.

7. The first device of claim 6, wherein the physical condition comprises one or more of a foot contact time of the person, a distance traveled by the person, a current pace of the person, and an average pace of the person.

8. The first device of claim 1, wherein the sensor is configured to monitor a physiological condition of the person.

9. A first, ambulatory device capable of engaging in wireless two-way communication with at least a second device, comprising:
   a first sensor configured to monitor a physical or physiological condition of a person;
   a first transmitter;
   a first receiver; and
   at least one first controller coupled to the first sensor, the first transmitter, and the first receiver, the at least one first controller being configured to power on the first receiver to listen for second messages from the second device during finite time periods following use of the first transmitter to transmit respective first messages to the second device, the at least one first controller being further configured to cause at least some of the first messages to include data concerning the physical or physiological condition of the person monitored by the first sensor, and to power down the first receiver after each of the finite time periods following use of the transmitter to transmit respective first messages to the second device;
   wherein the sensor is configured to monitor a physiological condition of the person, and wherein the physiological condition relates to one or more of a heart rate of the person, a blood pressure of the person, a body temperature of the person, a blood glucose level of the person, an electrocardiograph reading for the person, a pulse oximetry reading for the person, and an electromyography reading for the person.

10. The first device of claim 9, wherein the at least one first controller is further configured to, after each of the finite time periods following use of the first transmitter to transmit respective first messages to the second device, power down the first receiver until after the first transmitter is used to transmit another first message to the second device.

11. The first device of claim 9, in combination with the second device, wherein the second device comprises second circuitry configured to render the second device operable as at least one of a wristwatch, a cellular telephone, a personal data assistant, and a portable music device.

12. The first device of claim 9, in combination with the second device, wherein the second device comprises:
   a second transmitter;
   a second receiver; and
   at least one second controller coupled to the second transmitter and the second receiver, the at least one second controller being configured to power on the second transmitter to transmit second messages to the first device during finite time periods following reception by the second receiver of respective first messages from the first device, and being further configured to power down the second transmitter after transmission of each of the second messages from the second device to the first device.

13. The combination of claim 12, wherein the at least one second controller is configured to power down the second receiver during at least some time periods that are identified based upon information included in at least some of the first messages communicated from the first device to the second device, which information indicates when the first device expects to send at least one subsequent first message to the second device.

* * * * *